US012417864B2

(12) United States Patent
Takamura et al.

(10) Patent No.: US 12,417,864 B2
(45) Date of Patent: Sep. 16, 2025

(54) MULTILAYER VARISTOR

(71) Applicant: Panasonic Intellectual Property Management Co., Ltd., Osaka (JP)

(72) Inventors: Masashi Takamura, Hokkaido (JP); Yuto Akiyama, Hokkaido (JP); Ken Yanai, Hokkaido (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 346 days.

(21) Appl. No.: 18/182,134

(22) Filed: Mar. 10, 2023

(65) Prior Publication Data

US 2023/0326636 A1 Oct. 12, 2023

(30) Foreign Application Priority Data

Mar. 22, 2022 (JP) ................................ 2022-045844

(51) Int. Cl.

*H01C 7/10* (2006.01)
*H01C 1/14* (2006.01)
*H01C 7/102* (2006.01)
*H01C 7/112* (2006.01)

(52) U.S. Cl.

CPC ............. *H01C 7/1006* (2013.01); *H01C 1/14* (2013.01); *H01C 7/102* (2013.01); *H01C 7/112* (2013.01)

(58) Field of Classification Search

CPC ........ H01C 7/1006; H01C 1/14; H01C 7/102; H01C 7/112

See application file for complete search history.

(56) References Cited

U.S. PATENT DOCUMENTS 5,793,601 A * 8/1998 Nakamura ............ H01F 1/0027 361/321.5
7,085,118 B2 * 8/2006 Inoue ....................... H02H 9/04 361/119
2003/0043012 A1 * 3/2003 Shiraishi ................ H01C 7/102 338/21
2004/0233606 A1 * 11/2004 Inoue ....................... H01C 7/12 361/118
2007/0091532 A1 * 4/2007 Yamauchi ................ H01C 7/18 361/118
2011/0205725 A1 * 8/2011 Demcko .................. H01C 1/14 361/821

FOREIGN PATENT DOCUMENTS

JP H07-235406 A 9/1995

* cited by examiner

*Primary Examiner* — Kyung S Lee
(74) *Attorney, Agent, or Firm* — Rimon P.C.

(57) ABSTRACT

A multilayer varistor includes a sintered body and a first internal electrode, a second internal electrode, a third internal electrode, and a fourth internal electrode which are disposed in the sintered body. The first internal electrode, the second internal electrode, the third internal electrode, and the fourth internal electrode are arranged in an order of the first internal electrode, the third internal electrode, the fourth internal electrode, and the second internal electrode from a side of a first main face. The third internal electrode and the fourth internal electrode are electrically connected to each other. At least part of the first internal electrode and at least part of the third internal electrode overlap each other when viewed in a third direction. At least part of the second internal electrode and at least part of the fourth internal electrode overlap each other when viewed in the third direction.

20 Claims, 12 Drawing Sheets

MULTILAYER VARISTOR

CROSS-REFERENCE TO RELATED APPLICATION

The present application is based upon and claims the benefit of priority to Japanese Patent Application No. 2022-045844 filed on Mar. 22, 2022, the entire contents of which are incorporated herein by reference.

TECHNICAL FIELD

The present disclosure relates to multilayer varistors, and particularly, to a multilayer varistor including a plurality of internal electrodes.

BACKGROUND ART

As household appliances and in-vehicle electronic devices are recently downsized, which also requires downsizing of varistors which are components of the household appliances and in-vehicle electronic devices. In addition, when the frequency of a circuit in which a varistor is used is increased, the capacitance of the varistor may make an effect on the performance (surge-absorbing performance by the varistor). Therefore, there is a demand for a varistor that has a small capacitance and a small variation in the capacitance while a predetermined varistor voltage is secured. When varistors are used in a pair, two varistors formed in one element are proposed in order to reduce differences in capacitance between the varistors in the pair. Note that Literature 1 (JP H07-235406 A) is known as an example of information on prior art documents relating to the invention of the present application.

A conventional multilayer varistor has the problem that a stray capacitance generated between an internal electrode constituting one varistor and an internal electrode constituting the other varistor tends to cause cross-talk in which a signal leaks from one internal terminal to the other internal terminal.

SUMMARY

In view of the foregoing, it is an object of the present disclosure to provide a multilayer varistor capable of suppressing the occurrence of cross-talk.

A multilayer varistor according to an aspect of the present disclosure includes a sintered body, and a first internal electrode, a second internal electrode, a third internal electrode, and a fourth internal electrode which are disposed in the sintered body. The sintered body includes a first end face and a second end face opposite to each other in a first direction, a first side face and a second side face opposite to each other in a second direction intersecting the first direction, and a first main face and a second main face opposite to each other in a third direction intersecting the first direction and the second direction. The first internal electrode, the second internal electrode, the third internal electrode, and the fourth internal electrode are arranged in an order of the first internal electrode, the third internal electrode, the fourth internal electrode, and the second internal electrode from a side of the first main face. The third internal electrode and the fourth internal electrode are electrically connected to each other. At least part of the first internal electrode and at least part of the third internal electrode overlap each other when viewed in the third direction. At least part of the second internal electrode and at least part of the fourth internal electrode overlap each other when viewed in the third direction.

BRIEF DESCRIPTION OF THE DRAWINGS

The figures depict one or more implementation in accordance with the present teaching, by way of example only, not by way of limitations. In the figures, like reference numerals refer to the same or similar elements.

DETAILED DESCRIPTION

Figure 1:
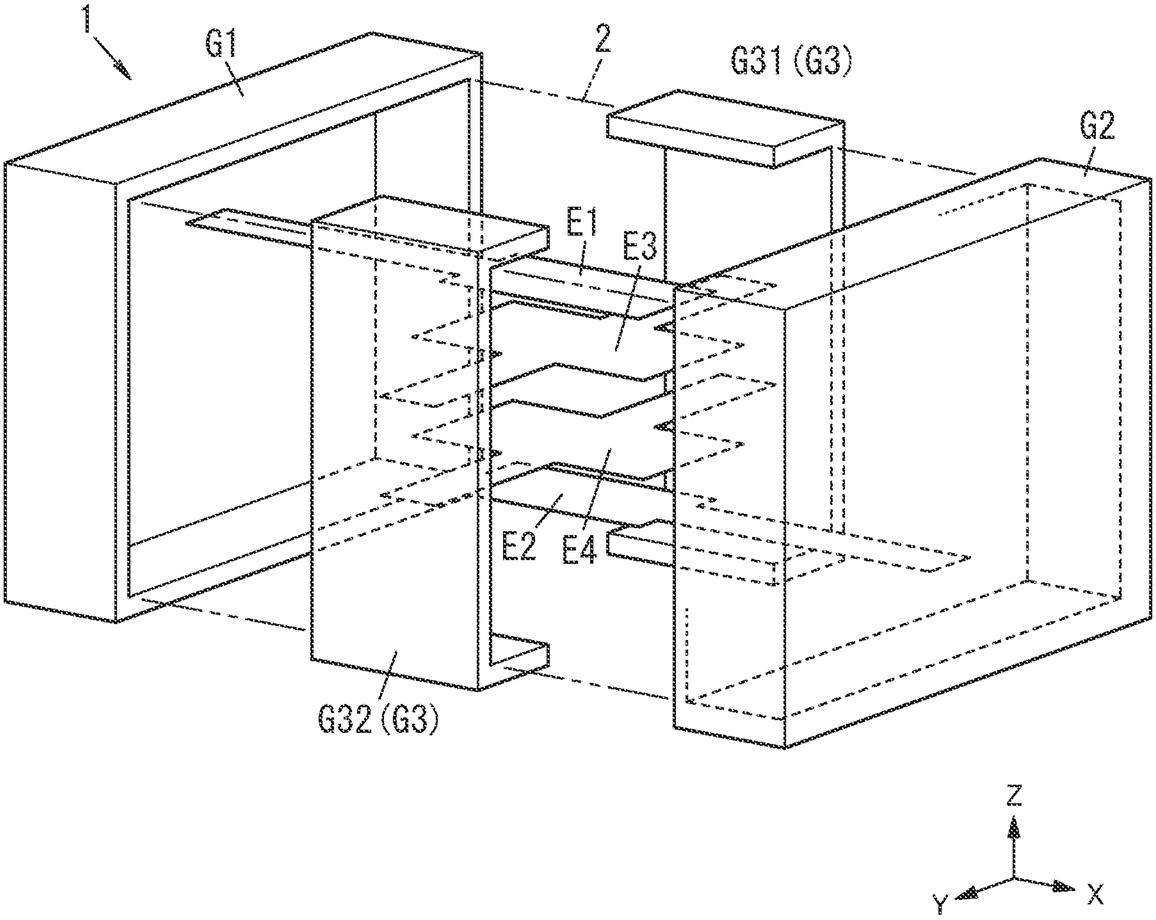
FIG. 1 is a transparent perspective view of a multilayer varistor according to an embodiment of the present disclosure.

A multilayer varistor 1 according to an embodiment of the present disclosure will be described in detail with reference to the drawings. Note that the embodiment and variations described below are merely examples of the present disclosure, and the present disclosure is not limited to the embodiment and the variations. The present disclosure may be modified variously without departing from the scope of technical idea of the present disclosure, even if not including the embodiment and the variations, according to design or the like. Further, the embodiment described below (including the variations) may be implemented by appropriately in combination.

(1) Overview

The overview of the multilayer varistor 1 will be described below with reference to FIGS. 1 to 4. Figures described in the following embodiment are schematic views, and the ratio of sizes and the ratio of thicknesses of components in the figures do not necessarily reflect actual dimensional ratios.

The multilayer varistor 1 includes a sintered body 2, and a first internal electrode E1, a second internal electrode E2, a third internal electrode E3, and a fourth internal electrode E4 which are disposed in the sintered body 2.

The sintered body 2 includes a first end face S11 and a second end face S12 opposite to each other in a first direction, a first side face S21 and a second side face S22 opposite to each other in a second direction intersecting the first direction, and a first main face S31 and a second main face S32 opposite to each other in a third direction intersecting the first direction and the second direction.

The first internal electrode E1, the second internal electrode E2, the third internal electrode E3, and the fourth internal electrode E4 are arranged in the order of the first internal electrode E1, the third internal electrode E3, the fourth internal electrode E4, and the second internal electrode E2 from the side of the first main face S31.

The third internal electrode E3 and the fourth internal electrode E4 are electrically connected to each other.

When viewed in the third direction, at least part of the first internal electrode E1 and at least part of the third internal electrode E3 overlap each other.

When viewed in the third direction, at least part of the second internal electrode E2 and at least part of the fourth internal electrode E4 overlap each other.

In the multilayer varistor 1 of the present embodiment, a first varistor region A1 is formed between the first internal electrode E1 and the third internal electrode E3, and a second varistor area A2 is formed between the second internal electrode E2 and the fourth internal electrode E4. In the first varistor region A1, a surge current flows when a surge voltage is applied between the first internal electrode E1 and the third internal electrode E3. In the second varistor area A2, a surge current flows when a surge voltage is applied between the second internal electrode E2 and the fourth internal electrode E4.

The multilayer varistor 1 is used by being arranged in the vicinity of a communication IC configured to perform communication based on, for example, a two-wire differential voltage transmission scheme. To the communication IC, lands of two signal lines and a land of a ground line are connected. Here, the first internal electrode E1 and the second internal electrode E2 are electrically connected to the lands of the two signal lines on a one-to-one basis. The third internal electrode E3 and the fourth internal electrode E4 are electrically connected to the land of the ground line.

According to the embodiment described above, a distance is provided between the third internal electrode E3 and the fourth internal electrode E4, and therefore, the distance between the first internal electrode E1 and the second internal electrode E2 can be greater than that in the case where functions of the third internal electrode E3 and the fourth internal electrode E4 are implemented by a single internal electrode. This can reduce the stray capacitance between the first internal electrode E1 and the second internal electrode E2 and thus can suppress the occurrence of cross-talk in which a signal leaks from the first internal electrode E1 constituting the first varistor region A1 to the second internal electrode E2 constituting the second varistor area A2.

(2) Details

The multilayer varistor 1 of the present embodiment will be described in detail below with reference to FIGS. 1 to 4.

Figure 2:
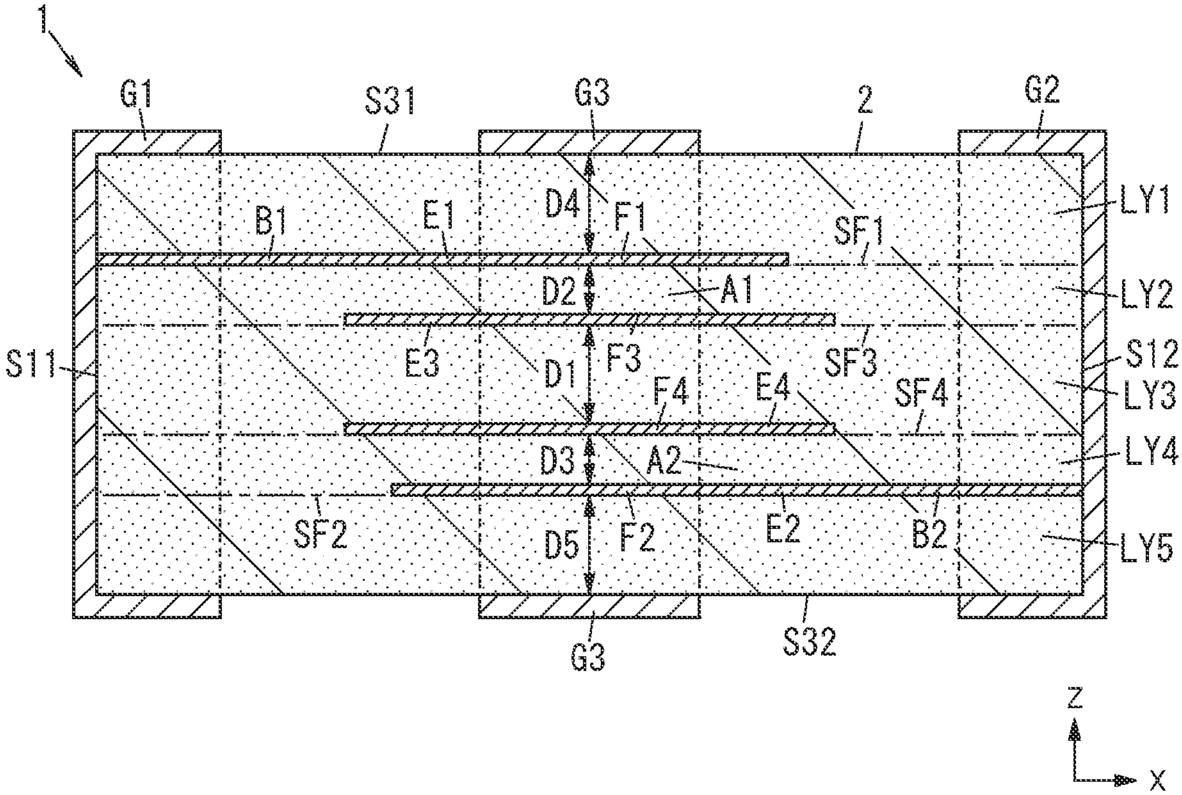
FIG. 2 is a sectional view of the multilayer varistor.
Figure 3:
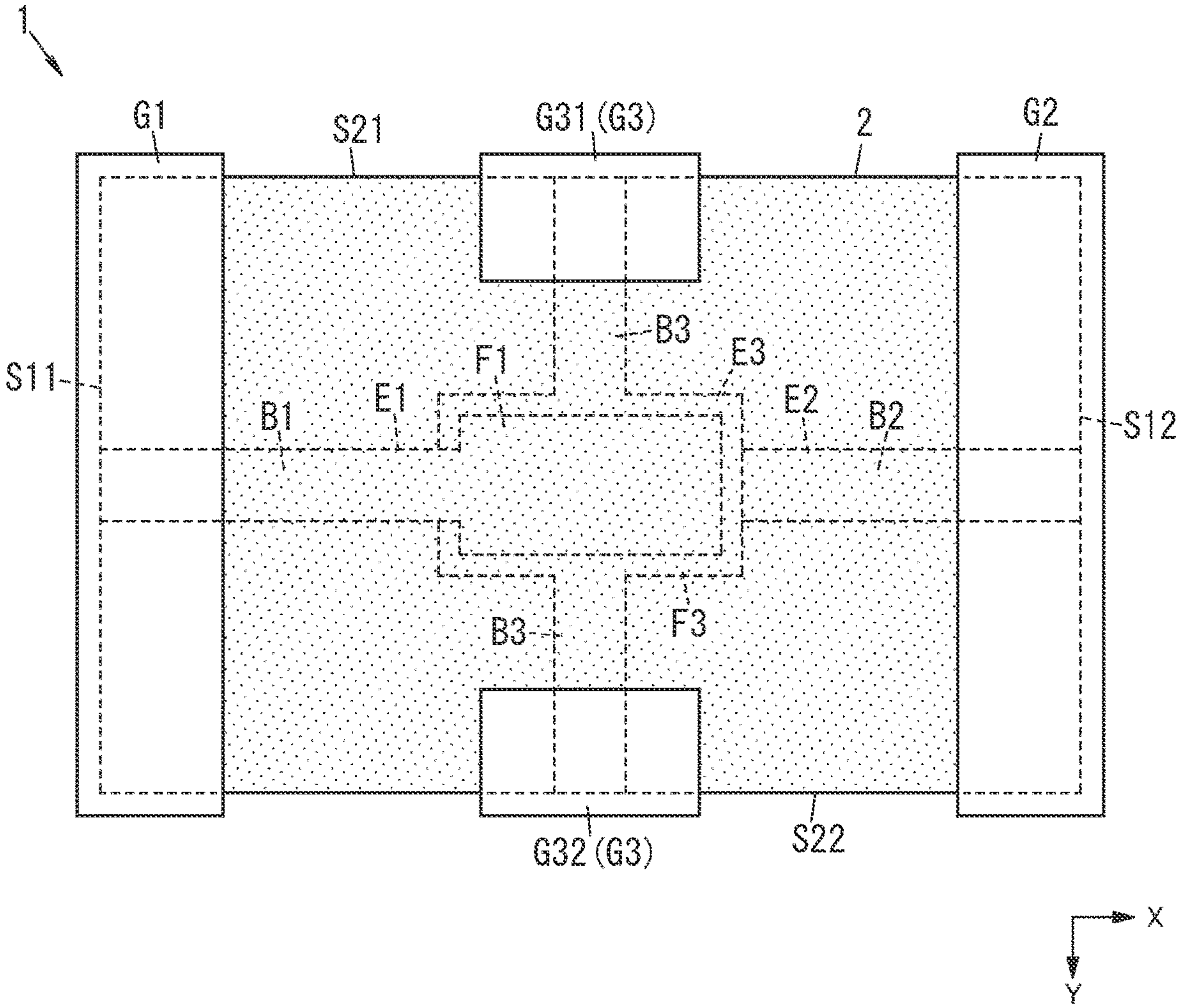
FIG. 3 is a transparent top view of the multilayer varistor.
Figure 4:
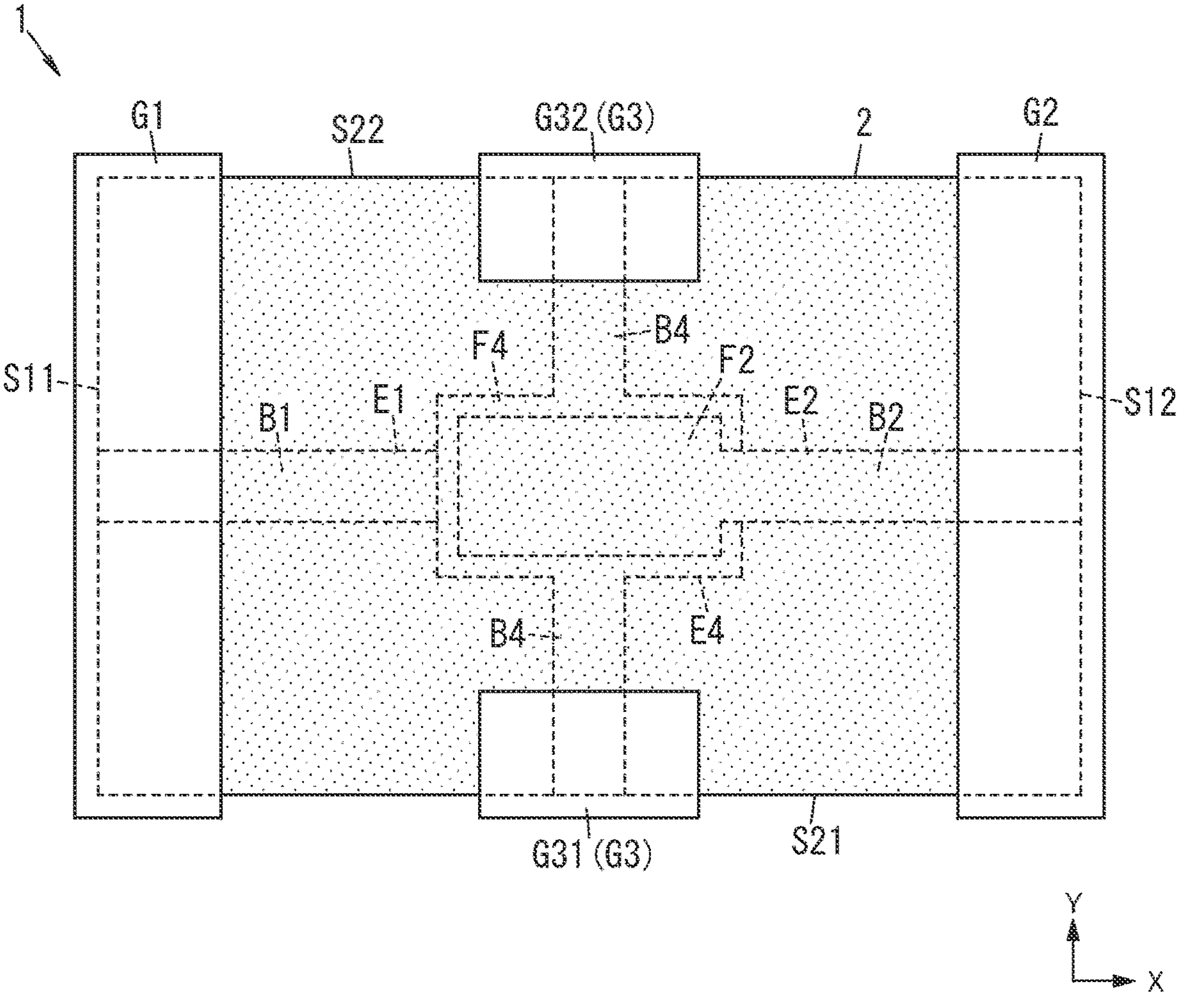
FIG. 4 is a transparent bottom view of the multilayer varistor.

FIG. 1 is a transparent perspective view of the multilayer varistor 1, FIG. 2 is a sectional view of the multilayer varistor 1, FIG. 3 is a transparent top view of the multilayer varistor 1, and FIG. 4 is a transparent bottom view of the multilayer varistor 1.

As described above, the multilayer varistor 1 includes the sintered body 2 and, for example, four internal electrodes (the first internal electrode E1, the second internal electrode E2, the third internal electrode E3, and the fourth internal electrode E4) which are disposed in the sintered body 2. The number of internal electrodes is not limited to four but may be changed as appropriate. The multilayer varistor 1 further includes a first external electrode G1, a second external electrode G2, and a third external electrode G3 disposed on a surface of the sintered body 2. The first internal electrode E1 is electrically connected to the first external electrode G1. The second internal electrode E2 is electrically connected to the second external electrode G2. The third internal electrode E3 and the fourth internal electrode E4 are electrically connected to the third external electrode G3. That is, the third internal electrode E3 and the fourth internal electrode E4 are electrically connected to each other via the third external electrode G3.

The sintered body 2 is, for example, in the shape of a rectangular parallelepiped having a length of 1.6 mm, a width of 0.8 mm, and a height of 0.8 mm. In FIG. 1 and other figures, the outer shape of the sintered body 2 is shown in the shape of a rectangular parallelepiped, but corner portions of the sintered body 2 may be appropriately beveled, or the corner portions of the sintered body 2 may be rounded.

In the following description, the long side direction (left/right direction) of the sintered body 2 is defined as an "X-axis direction", the depth direction (forward/backward direction) of the sintered body 2 is defined as a "Y-axis direction", and the thickness direction (up/down direction) of the sintered body 2 is defined as a "Z-axis direction". The X axis, the Y axis, and the Z axis defining these directions are orthogonal to each other. Moreover, the positive direction of the X axis is defined as a right side, the positive direction of the Y axis is defined as a forward side, and the positive direction of the Z axis is defined as an upside. However, these directions are only examples and should not be construed as limiting the directions of the multilayer varistor 1 in use. In addition, the arrows indicating the "X-axis direction", the "Y-axis direction", and the "Z-axis direction" on the drawings are shown only for the purpose of explanation and are intangible.

The sintered body 2 has, as shown in FIGS. 2 to 4, the first end face S11 and the second end face S12 opposite to each other in the X-axis direction, the first side face S21 and the second side face S22 opposite to each other in the Y-axis direction, and the first main face S31 and the second main face S32 opposite to each other in the Z-axis direction. That is, the X-axis direction corresponds to the "first direction" in which the first end face S11 and the second end face S12 are opposite to each other. The Y-axis direction corresponds to the "second direction" in which the first side face S21 and the second side face S22 are opposite to each other. The Z-axis direction corresponds to the "third direction" in which the first main face S31 and the second main face S32 are opposite to each other.

The sintered body 2 includes a semiconductor ceramic component having a non-linearity resistance characteristic. The sintered body 2, for example, includes ZnO as a major component, may include, as a minor component, at least one selected from the group consisting of $Bi_2O_3$, $Co_2O_3$, $MnO_2$, and $Sb_2O_3$, and may include at least one selected from the group consisting of $Pr_6O_{11}$, $Co_2O_3$, $CaCO_3$, and $Cr_2O_3$. In the sintered body 2, ZnO is sintered, and the other minor components are deposited on the grain boundary of ZnO particles. A grain boundary barrier formed between the ZnO particles expresses the non-linearity resistance characteristic. The sintered body 2 is formed, for example, by stacking five layers LY1 to LY5 (see FIG. 2) including ZnO as a major component on one another in the third direction and then sintering the five layers LY1 to LY5. The surface of the sintered body 2 may be covered with a high-resistance layer having a higher resistance than the sintered body 2.

The first external electrode G1, the second external electrode G2, and the third external electrode G3 are disposed on the surface of the sintered body 2. As shown in FIG. 1, the multilayer varistor 1 of the present embodiment includes two third external electrodes G3 (third external electrodes G31, G32). That is, the multilayer varistor 1 of the present embodiment is a so-called four-terminal multilayer varistor. The number of the third external electrodes G3 is not limited to two but may be one or three or more.

The first external electrode G1, the second external electrode G2, and the third external electrodes G31 and G32 are made of, for example, metal such as silver, copper, platinum, or an alloy thereof. The first external electrode G1, the second external electrode G2, and the third external electrodes G31 and G32 may include a primary electrode made of metal such as silver, copper, platinum, or an alloy thereof and a secondary electrode made of a plated layer of nickel, tin, or the like formed on a surface of the primary electrode.

The first external electrode G1 and the second external electrode G2 are formed, for example, by dipping each of the first end face S11 and the second end face S12 of the sintered body 2 into a conductive paste.

The first external electrode G1 is disposed on the entire surface of the first end face S11 and on a left end portion of each of the first side face S21, the second side face S22, the first main face S31, and the second main face S32.

The second external electrode G2 is disposed on the entire surface of the second end face S12 and on a right end portion of each of the first side face S21, the second side face S22, the first main face S31, and the second main face S32.

The third external electrodes G31 and G32 are formed by, for example, roller-transferring of a conductive paste onto the surface of the sintered body 2.

The third external electrode G31 is disposed on a central portion of the first side face S21, the center of a rear end portion of the first main face S31, and the center of a rear end portion of the second main face S32.

The third external electrode G32 is disposed on a central portion of the second side face S22, the center of a front end portion of the first main face S31, and the center of a front end portion of the second main face S32.

The first internal electrode E1, the second internal electrode E2, the third internal electrode E3, and the fourth internal electrode E4 are disposed in the sintered body 2.

Here, as described above, the sintered body 2 includes the five layers LY1 to LY5 (see FIG. 2) stacked on one another in the third direction. As shown in FIG. 2, the layers LY1 to LY5 are stacked in the order of the layers LY1, LY2, LY3, LY4, and LY5 from the top.

The first internal electrode E1 is disposed, for example, on an upper surface of the layer LY2 (hereinafter also referred to as a first laminated surface SF1). The second internal electrode E2 is disposed, for example, on an upper surface of the layer LY5 (hereinafter also referred to as a second aminated surface SF2). The third internal electrode E3 is disposed, for example, on an upper surface of the layer LY3 (hereinafter referred to as a third laminated surface SF3). The fourth internal electrode E4 is disposed, for example, on an upper surface of the layer LY4 (hereinafter also referred to as a fourth laminated surface SF4). Thus, in the third direction (up/down direction), the first internal electrode E1, the second internal electrode E2, the third internal electrode E3, and the fourth internal electrode E4 are arranged such that the first internal electrode E1, the third internal electrode E3, the fourth internal electrode E4, and the second internal electrode E2 are separated from each other in this order from the side of the first main face S31. Specifically, as shown in FIG. 2, the third internal electrode E3 and the fourth internal electrode E4 are spaced apart from each other by a first distance D1 along the third direction. The first internal electrode E1 and the third internal electrode E3 are spaced apart from each other by a second distance D2 along the third direction. The second internal electrode E2 and the fourth internal electrode E4 are spaced apart from each other by a third distance D3 along the third direction.

Here, the first distance D1 is preferably 0.5 or more times each of the second distance D2 and the third distance D3. In the present embodiment, the first distance D1 is a distance longer than each of the second distance D2 and the third distance D3. More preferably, the first distance D1 is 1.2 or more times each of the second distance D2 and the third distance D3.

Accordingly, the distance between the first internal electrode E1 and the second internal electrode E2 is longer than each of the second distance D2 and the third distance D3, which can reduce the stray capacitance between the first internal electrode E1 and the second internal electrode E2, thereby suppressing the occurrence of cross-talk.

The first internal electrode E1 is spaced apart from the first main face S31 by a fourth distance D4 along the third direction. The fourth distance D4 is a distance longer than the second distance D2.

Accordingly, the distance between the first internal electrode E1 and the part of the second external electrode G2 provided on the right end portion of the first main face S31 is satisfactorily longer than the second distance D2. Here, as described above, the second external electrode G2 is electrically connected to the second internal electrode E2. Therefore, the stray capacitance between the first internal electrode E1 and the second internal electrode E2 can be reduced, thereby suppressing the occurrence of cross-talk.

The second internal electrode E2 is spaced apart from the second main face S32 by a fifth distance D5 along the third direction. The fifth distance D5 is a distance longer than the third distance D3.

Accordingly, the distance between the second internal electrode E2 and the part of the first external electrode G1 provided on the left end portion of the second main face S32 is satisfactorily longer than the third distance D3. Here, as described above, the first external electrode G1 is electrically connected to the first internal electrode E1. Therefore, the stray capacitance between the first internal electrode E1 and the second internal electrode E2 can be reduced, thereby suppressing the occurrence of cross-talk.

As shown in FIGS. 3 and 4, the first internal electrode E1 includes a first facing part F1 and a first lead-out part B1. The first lead-out part B1 has a narrower width in the second direction than the first facing part F1 and protrudes leftward from the first facing part F1 along the first direction. The first lead-out part B1 has a left end electrically connected to the first external electrode G1.

The second internal electrode E2 has a second facing part F2 and a second lead-out part B2. The second lead-out part B2 has a narrower width in the second direction than the second facing part F2 and protrudes rightward from the second facing part F2 along the first direction. The second lead-out part B2 has a right end electrically connected to the second external electrode G2.

The width of the first facing part F1 in the second direction is equal to the width of the second facing part F2 in the second direction, for example. Further, the width of the first facing part F1 in the first direction is equal to the width of the second facing part F2 in the first direction, for example.

The third internal electrode E3 has a third facing part F3 and, for example, two third lead-out parts B3. Each of the two third lead-out parts B3 has a narrower width in the first direction than the third facing part F3, one of the third lead-out parts B3 protrudes forward from the third facing part F3 along the second direction, and the other of the third lead-out parts B3 protrudes backward from the third facing part F3 along the second direction. The third lead-out part B3 protruding backward is electrically connected to the third external electrode G31, and the third lead-out part B3 protruding forward is electrically connected to the third external electrode G32.

The fourth internal electrode E4 has a fourth facing part F4 and two fourth lead-out parts B4. The two fourth lead-out parts B4 each have a narrower width in the first direction than the fourth facing part F4, one of the fourth lead-out parts B4 protrudes forward from the fourth facing part F4 along the second direction, and the other of the fourth lead-out parts B4 protrudes backward from the fourth facing part F4 along the second direction. The fourth lead-out part B4 protruding backward is electrically connected to the third external electrode G31, and the fourth lead-out part B4 protruding frontward is electrically connected to the third external electrode G32. Therefore, the third internal electrode E3 and the fourth internal electrode E4 are electrically connected to each other via the third external electrodes G31 and G32.

As shown in FIG. 3, the first internal electrode E1 and the third internal electrode E3 are arranged such that at least part of the first internal electrode E1 and at least part of the third internal electrode E3 overlap each other when viewed from above. Specifically, when viewed from above, the third facing part F3 of the third internal electrode E3 is larger than the first facing part F1 of the first internal electrode E1, and thus, the first facing part F1 and part of the first lead-out part B1 are included in the third facing part F3. Thus, the first varistor region A1 is formed between the third facing part F3 and a set of the first facing part F1 and the part of the first lead-out part B1. The first varistor region A1 preferably has a first capacitance of less than or equal to 200 pF.

Further, as shown in FIG. 4, the second internal electrode E2 and the fourth internal electrode E4 are arranged such that at least part of the second internal electrode E2 and at least part of the fourth internal electrode E4 overlap each other when viewed from below. Specifically, when viewed from below, the fourth facing part F4 of the fourth internal electrode E4 is larger than the second facing part F2 of the second internal electrode E2, and thus, the second facing part F2 and part of the second lead-out part B2 are included in the fourth facing part F4. Thus, the second varistor area A2 is formed between the fourth facing part F4 and a set of the second facing part F2 and the part of the second lead-out part B2. The second varistor area A2 preferably has a second capacitance of less than or equal to 200 pF. The difference between the first capacitance and the second capacitance is preferably less than or equal to 20% of the first capacitance. This can reduce the effect of the difference between the first capacitance and the second capacitance on the surge-absorbing property of the multilayer varistor 1.

Further, the third internal electrode E3 and the fourth internal electrode E4 are arranged such that at least part of the third internal electrode E3 and at least part of the fourth internal electrode E4 overlap each other when viewed in the third direction. Specifically, the third internal electrode E3 and the fourth internal electrode E4 are formed to have the same shape when viewed in the third direction, and the third internal electrode E3 and the fourth internal electrode E4 overlap each other in the entire area thereof when viewed in the third direction, for example.

Therefore, in the present embodiment, the first internal electrode E1, the second internal electrode E2, the third internal electrode E3, and the fourth internal electrode E4 are arranged such that at least part of the first internal electrode E1, at least part of the second internal electrode E2, at least part of the third internal electrode E3, and at least part of the fourth internal electrode E4 overlap each other when viewed in the third direction.

Accordingly, the at least part of the third internal electrode E3 and the at least part of the fourth internal electrode E4 shield the at least part of the first internal electrode E1 from the at least part of the second internal electrode E2, and the occurrence of cross-talk can thus be suppressed. In addition, this makes the multilayer varistor 1 downsized.

(3) Variations

Variations of the embodiment will be described below. However, the same reference numerals are given to the same constituent elements as those in the embodiment, and description thereof will be omitted as appropriate. Further, the configurations of the variations described below can be appropriately combined with the configuration described in the embodiment.

(3.1) First Variation

Figure 5:
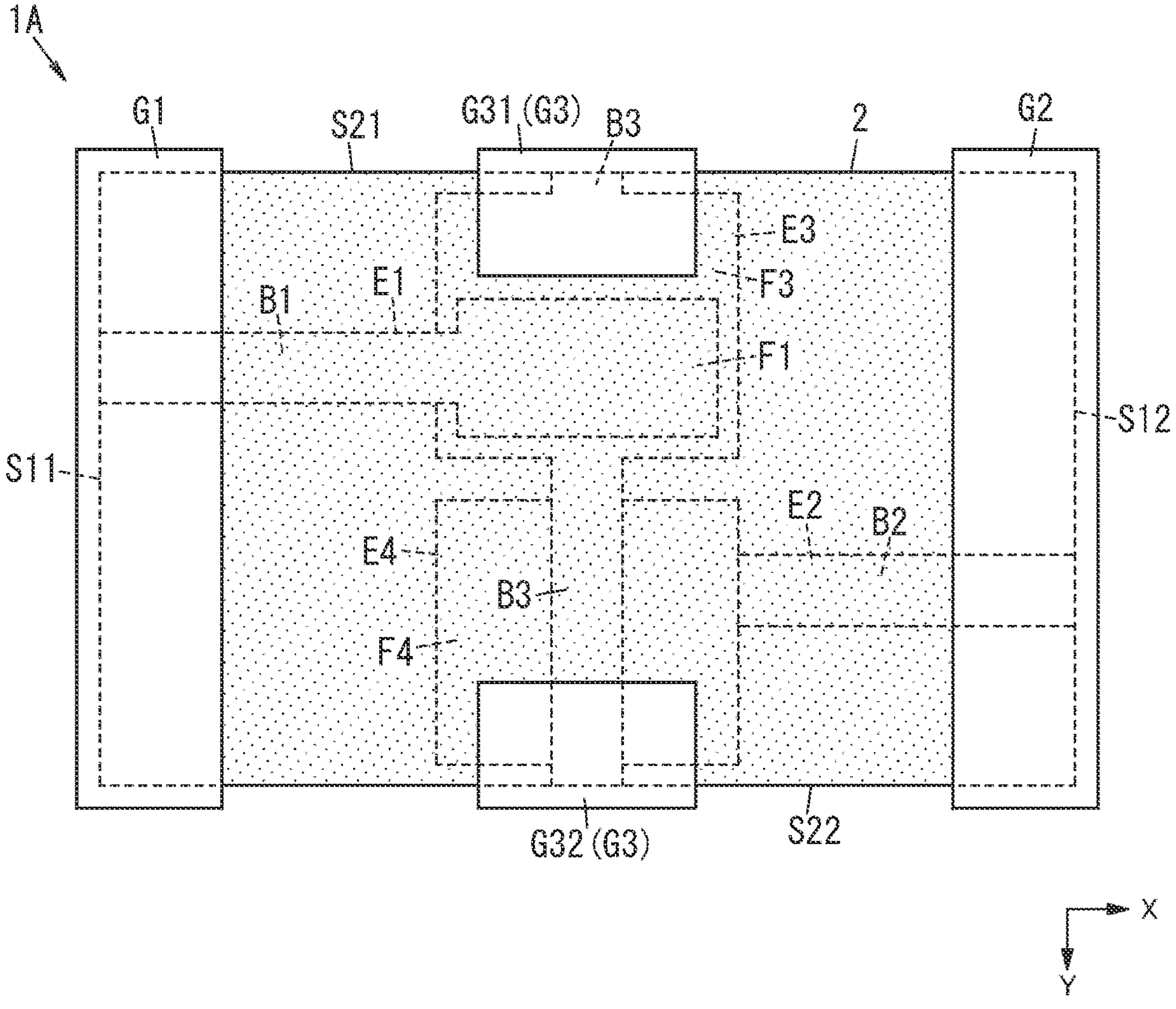
FIG. 5 is a transparent top view of a multilayer varistor of a first variation.
Figure 6:
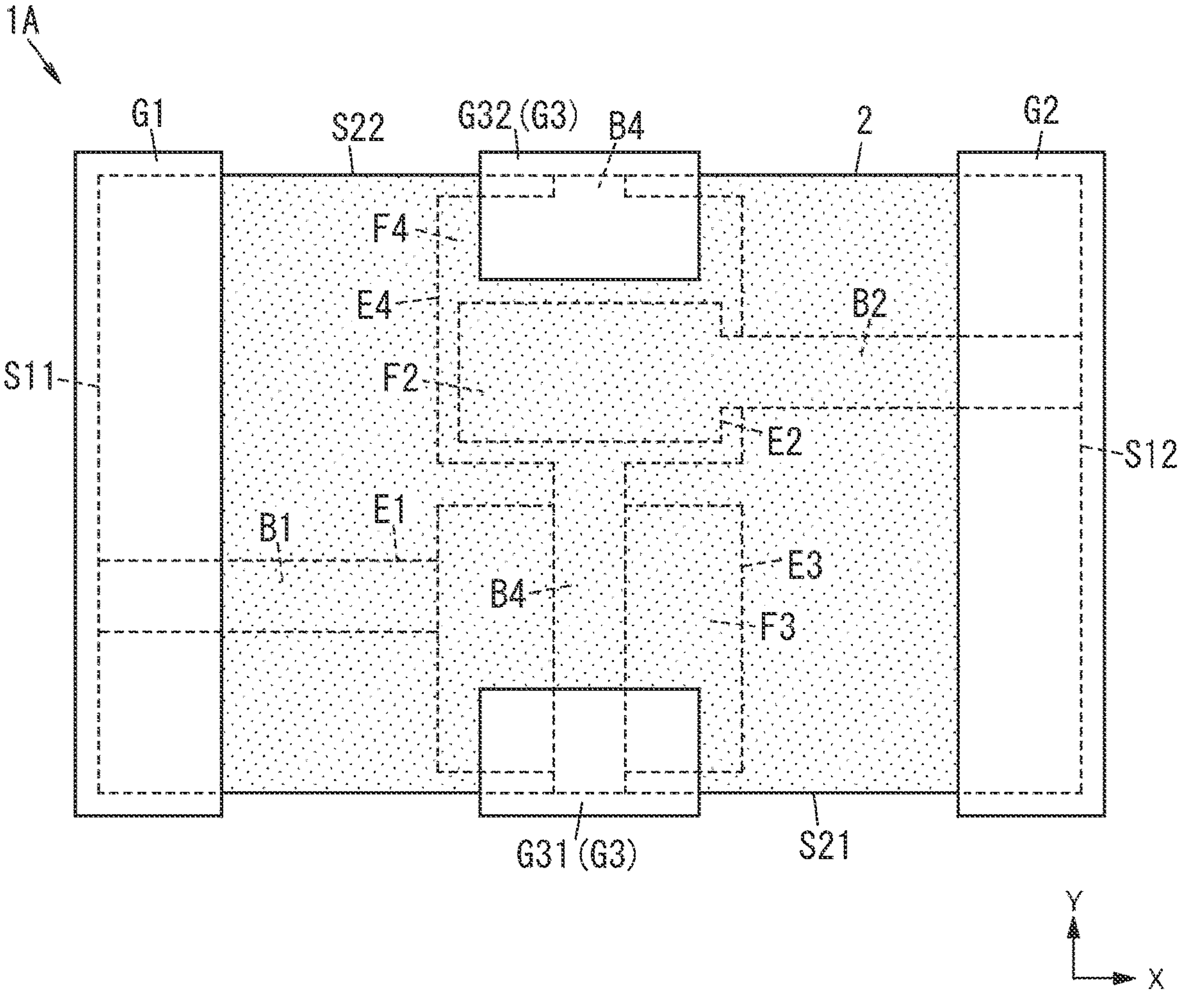
FIG. 6 is a transparent bottom view of the multilayer varistor of the first variation.

As shown in FIGS. 5 and 6, a multilayer varistor 1A of a first variation includes a first internal electrode E1 and a second internal electrode E2 which are arranged so as not to overlap each other when viewed in the third direction. Specifically, in the multilayer varistor 1A, the first internal electrode E1 and the second internal electrode E2 are aligned in the forward/backward direction when viewed in the third direction.

In the multilayer varistor 1A, for example, a third facing part F3 of a third internal electrode E3 and a fourth facing part F4 of a fourth internal electrode E4 are arranged side by side in the forward/backward direction when viewed in the third direction. In other words, the third facing part F3 of the third internal electrode E3 and the fourth facing part F4 of the fourth internal electrode E4 are disposed at locations where they do not overlap each other when viewed in the third direction. In this variation, the third facing part F3 is larger than a first facing part F1, and thus, the first facing part F1 and part of a first lead-out part B1 are included in the third facing part F3 as in the embodiment described above. Further, when viewed from below, the fourth facing part F4 is larger than a second facing part F2, and thus, the second facing part F2 and part of a second lead-out part B2 are included in the fourth facing part F4 as in the embodiment described above.

Accordingly, the distance between the first internal electrode E1 and the second internal electrode E2 can be made greater than that in the embodiment described above, and therefore, the stray capacitance between the first internal electrode E1 and the second internal electrode E2 can be reduced, thereby suppressing the occurrence of cross-talk.

The first internal electrode E1 and the second internal electrode E2 may be arranged side by side in the left/right direction when viewed in the third direction.

(3.2) Second Variation

Figure 7:
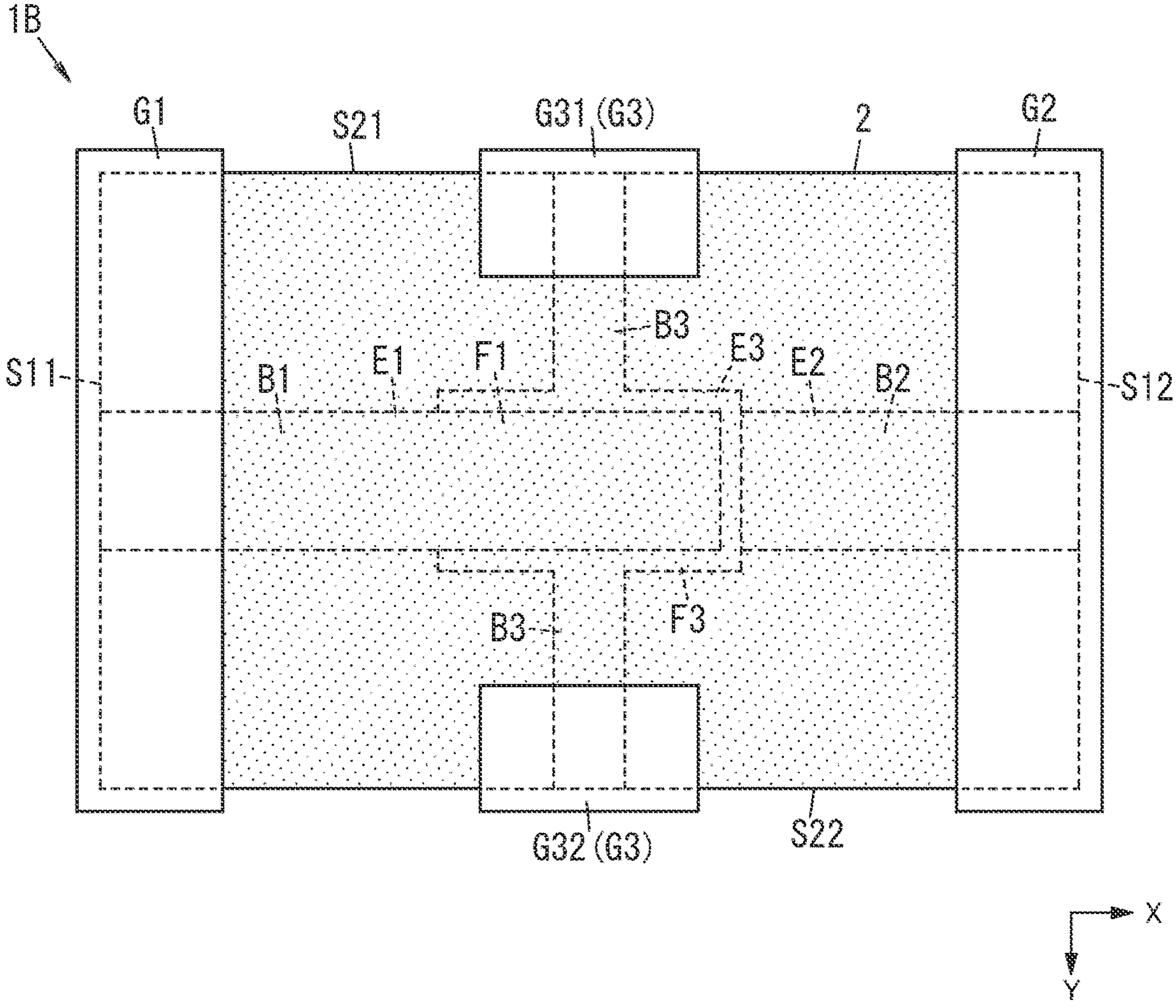
FIG. 7 is a transparent top view of a multilayer varistor of a second variation.

As shown in FIG. 7, a multilayer varistor 1B of a second variation is configured such that the width of a first lead-out part B1 in the second direction is equal to the width of a first facing part F1 in the second direction. In addition, the width of a second lead-out part B2 in the second direction is equal to the width of a second facing part F2 in the second direction.

Thus, the connection stability of the first lead-out part B1 with a first external electrode G1 and the connection stability of the second lead-out part B2 with a second external electrode G2 can be improved.

(3.3) Third Variation

Figure 8:
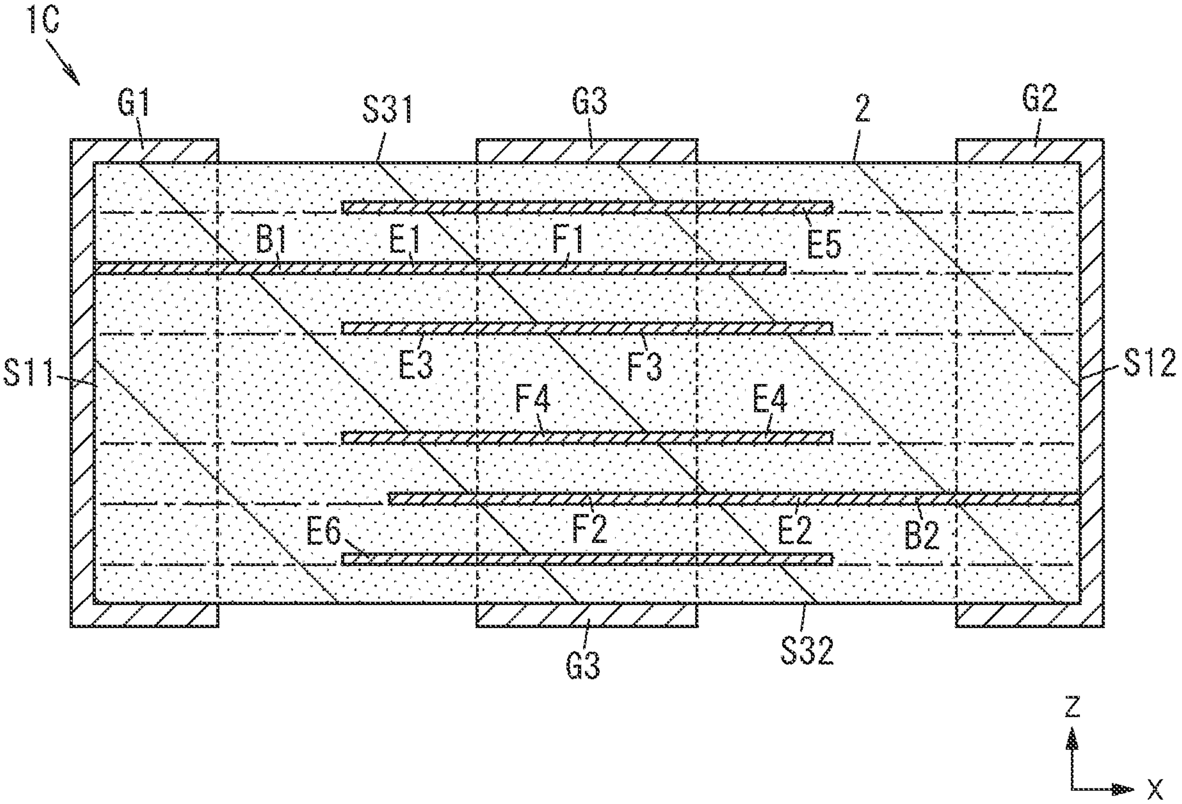
FIG. 8 is a sectional view of a multilayer varistor of a third variation.

As shown in FIG. 8, a multilayer varistor 1C of a third variation includes a first internal electrode E1, a second internal electrode E2, a third internal electrode E3, and a fourth internal electrode E4 which are in a sintered body 2. The multilayer varistor 1C further includes a fifth internal electrode E5 and a sixth internal electrode E6.

The fifth internal electrode E5 is disposed between the first internal electrode E1 and a first main face S31.

The fifth internal electrode E5 is electrically connected to the third internal electrode E3. Specifically, the fifth internal electrode E5 is electrically connected to a third external electrode G3. That is, the fifth internal electrode E5 is electrically connected to the third internal electrode E3 via the third external electrode G3.

The sixth internal electrode E6 is disposed between the second internal electrode E2 and a second main face S32.

The sixth internal electrode E6 is electrically connected to the fourth internal electrode E4. Specifically, the sixth internal electrode E6 is electrically connected to the third external electrode G3. In other words, the sixth internal electrode E6 is electrically connected to the fourth internal electrode E4 via the third external electrode G3.

The fifth internal electrode E5 covers, for example, a first facing part F1 of the first internal electrode E1. Thus, the fifth internal electrode E5 can shield the first facing part F1 from a second external electrode G2 disposed at a right end of the first main face S31, thereby suppressing the occurrence of cross-talk. Further, a varistor region is formed also between the first facing part F1 and the fifth internal electrode E5, thereby increasing the surge-current tolerance of the multilayer varistor 1C.

The sixth internal electrode E6 covers, for example, a second facing part F2 of the second internal electrode E2. Thus, the sixth internal electrode E6 can shield the second facing part F2 from a first external electrode G1 provided at a left end of the second main face S32, thereby suppressing the occurrence of cross-talk. Further, a varistor region is formed also between the second facing part F2 and the sixth internal electrode E6, thereby increasing the surge-current tolerance of the multilayer varistor 1C.

(3.4) Fourth Variation

Figure 9:
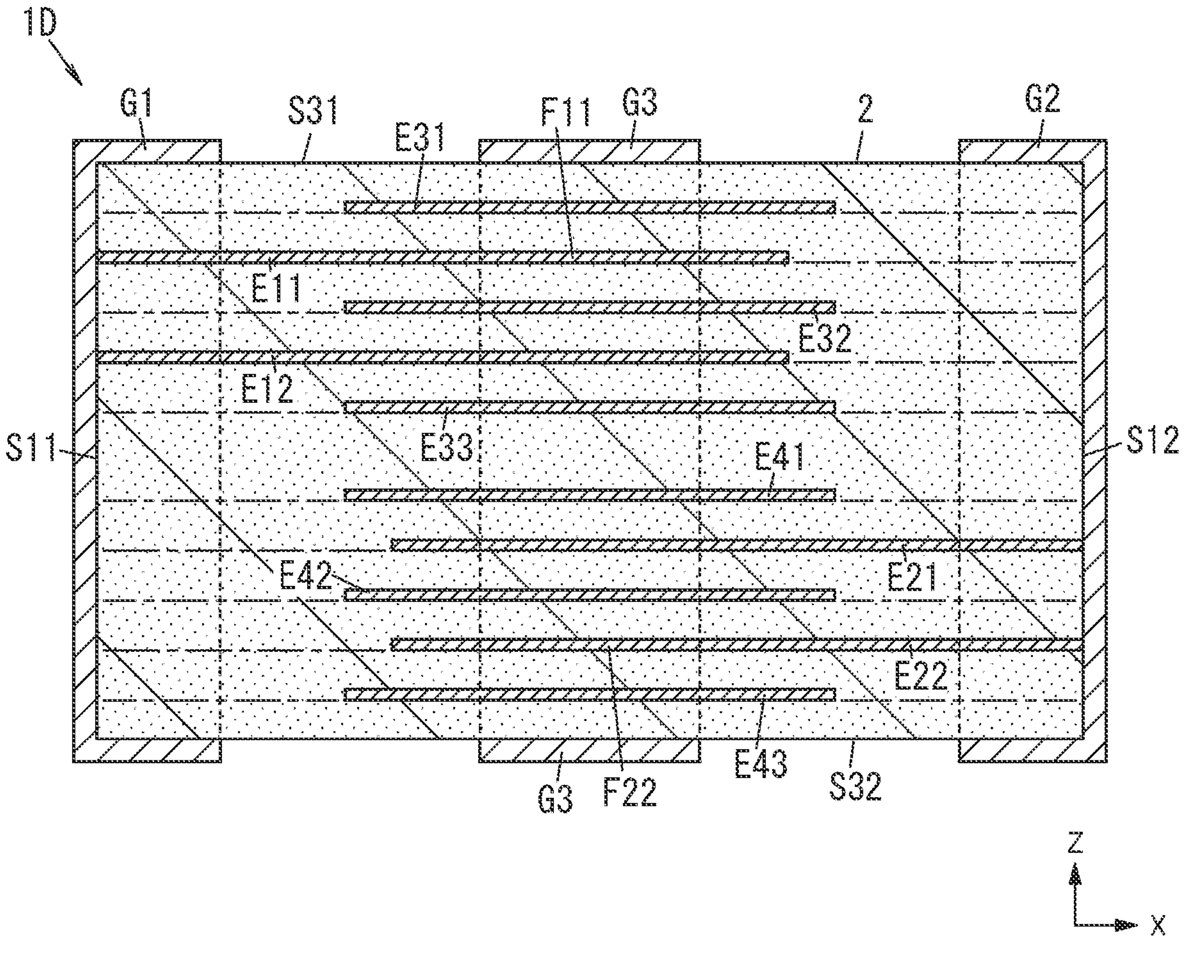
FIG. 9 is a sectional view of a multilayer varistor of a fourth variation.

As shown in FIG. 9, a multilayer varistor 1D of a fourth variation includes, for example, two first internal electrodes E1 (E11, E12), for example, two second internal electrodes E2 (E21, E22), for example, three third internal electrodes E3 (E31, E32, E33), and for example, three fourth internal electrodes E4 (E41, E42, E43) which are in a sintered body 2.

These internal electrodes are arranged in the order of the third internal electrode E31, the first internal electrode E11, the third internal electrode E32, the first internal electrode E12, the third internal electrode E33, the fourth internal electrode E41, the second internal electrode E21, the fourth internal electrode E42, the second internal electrode E22, and the fourth internal electrode E43 from the side of a first main face S31.

The first internal electrodes E11 and E12 are electrically connected to a first external electrode G1.

The second internal electrodes E21 and E22 are electrically connected to a second external electrode G2.

The third internal electrodes E31, E32, and E33 are electrically connected to a third external electrode G3.

The fourth internal electrode E41, E42, and E43 are electrically connected to the third external electrode G3.

The third internal electrode E31 covers, for example, a first facing part F11 of the first internal electrode E11. Thus, the third internal electrode E31 can shield the first facing part F11 from the second external electrode G2 provided at a right end of the first main face S31, thereby suppressing the occurrence of cross-talk. Further, a varistor region is formed also between the first facing part F11 and the third internal electrode E31, thereby increasing the surge-current tolerance of the multilayer varistor 1D.

The fourth internal electrode E43 covers, for example, a second facing part F22 of the second internal electrode E22. Thus, the fourth internal electrode E43 can shield the second facing part F22 from the first external electrode G1 provided on a left end of a second main face S32, thereby suppressing the occurrence of cross-talk. Further, a varistor region is formed also between the second facing part F22 and the fourth internal electrode E43, thereby increasing the surge-current tolerance of the multilayer varistor 1D.

(3.5) Fifth Variation

Figure 10:
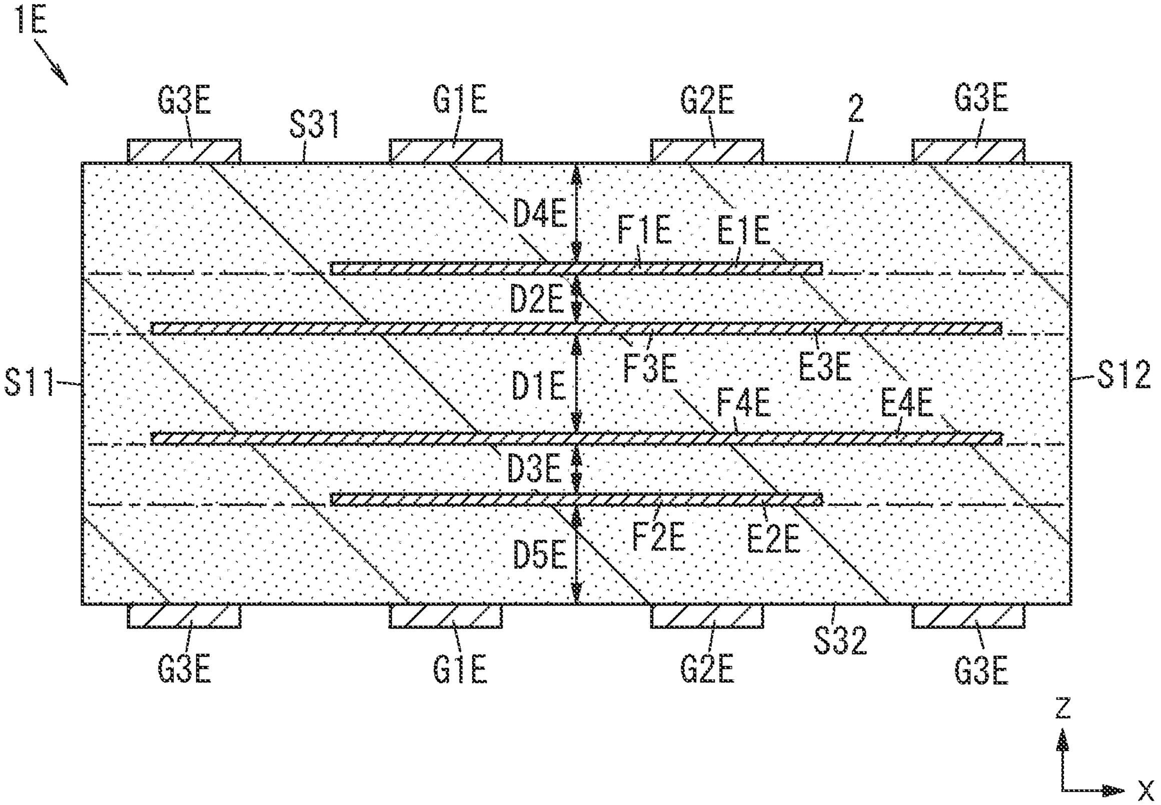
FIG. 10 is a sectional view of a multilayer varistor of a fifth variation.
Figure 11:
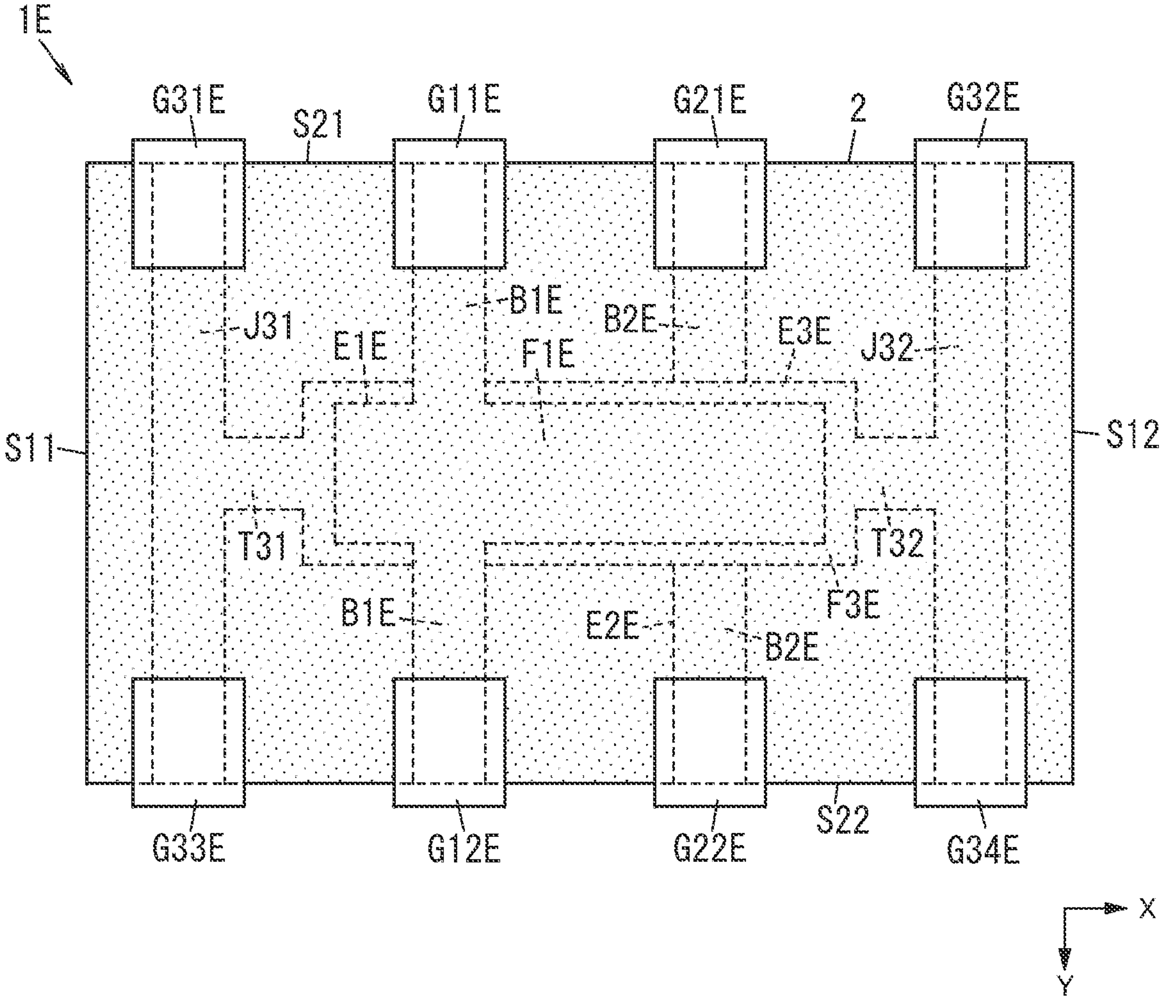
FIG. 11 is a transparent top view of the multilayer varistor of the fifth variation.
Figure 12:
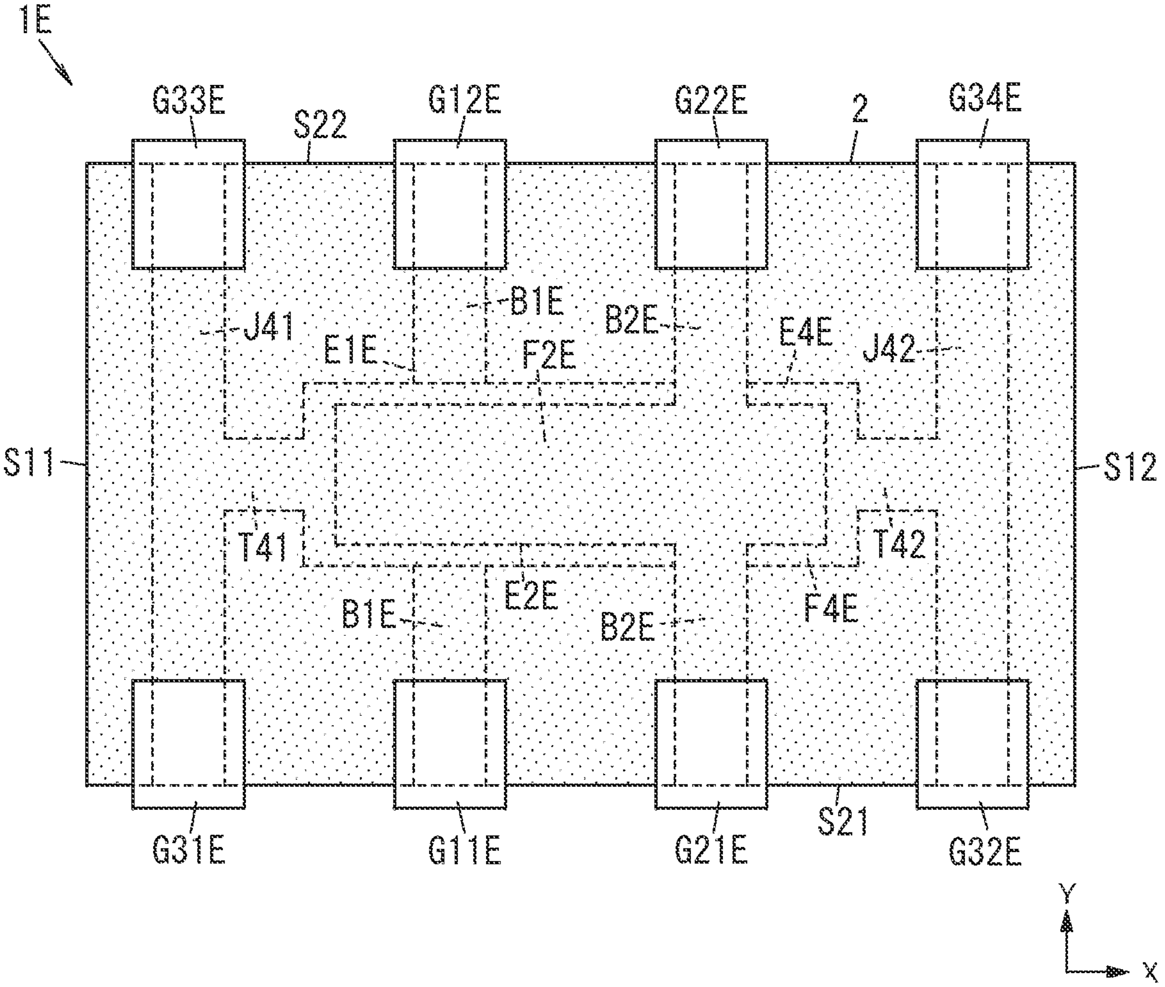
FIG. 12 is a transparent bottom view of the multilayer varistor of the fifth variation.

As shown in FIGS. 10 to 12, a multilayer varistor 1E of a fifth variation is a so-called eight-terminal multilayer varistor.

The multilayer varistor 1E includes a first external electrode G1E (G11E) and a second external electrode G2E (G21E) arranged side by side in the first direction on a central portion of a first side face S21. On the first side face S21, a third external electrode G3E (G31E) is disposed on the left side of the first external electrode G11E, and a third external electrode G3E (G32E) is disposed on the right side of the second external electrode G21E. That is, in the first direction, the third external electrode G31E, the first external electrode G11E, the second external electrode G21E, and the third external electrode G32E are arranged in this order.

Similarly, a first external electrode G1E (G12E) and a second external electrode G2E (G22E) are arranged side by side in the first direction on a central portion of a second side face S22. On the second side face S22, a third external electrode G3E (G33E) is disposed on the left side of the first external electrode G12E, and a third external electrode G3E(G34E) is disposed on the right side of the second external electrode G22E. That is, in the first direction, the third external electrode G33E, the first external electrode G12E, the second external electrode G22E, and the third external electrode G34E are arranged in this order.

As shown in FIG. 10, in the multilayer varistor 1E, a first internal electrode E1E, a third internal electrode E3E, a fourth internal electrode E4E, and a second internal electrode E2E are arranged, in a sintered body 2, in this order from the side of a first main face S31, wherein these electrodes are separated from each other. The third internal electrode E3E and the fourth internal electrode E4E are spaced apart from each other by a first distance DIE along the third direction. The first internal electrode E1E and the third internal electrode E3E are spaced apart from each other by a second distance D2E along the third direction. The second internal electrode E2E and the fourth internal electrode E4E are spaced apart from each other by a third distance D3E along the third direction. The first distance DIE is a distance longer than each of the second distance D2E and the third distance D3E.

The first internal electrode E1E is spaced apart from the first main face S31 by a fourth distance D4E along the third direction. The fourth distance D4E is a distance longer than the second distance D2E.

The second internal electrode E2E is spaced apart from a second main face S32 by a fifth distance D5E along the third direction. The fifth distance D5E is a distance longer than the third distance D3E.

The first internal electrode E1E includes a first facing part F1E and two first lead-out parts B1E. In the first direction, each first lead-out part B1E has a narrower width than the first facing part F1E. One of the two first lead-out parts B1E protrudes forward from the first facing part F1E, and the other of the two first lead-out parts B1E protrudes backward from the first facing part F1E. The first lead-out part B1E protruding backward is electrically connected to the first external electrode G11E, and the first lead-out part B1E protruding forward is electrically connected to the first external electrode G12E.

The second internal electrode E2E includes a second facing part F2E and two second lead-out parts B2E. In the first direction, each second lead-out part B2E has a narrower width than the second facing part F2E. One of the two second lead-out parts B2E protrudes forward from the second facing part F2E, and the other of the two second lead-out parts B2E protrudes backward from the second facing part F2E. The second lead-out part B2E protruding backward is electrically connected to the second external electrode G21E, and the second lead-out part B2E protruding forward is electrically connected to the second external electrode G22E.

The third internal electrode E3E includes a third facing part F3E, a first connection part J31, a first projection part T31, a second connection part J32, and a second projection part T32.

The first connection part J31 connects the third external electrode G31E to the third external electrode G33E. The first projection part T31 has a narrower width than the third facing part F3E in the second direction, protrudes leftward from the third facing part F3E, and is connected to the first connection part J31.

The second connection part J32 connects the third external electrode G32E to the third external electrode G34E. The second projection part T32 has a narrower width than the third facing part F3E in the second direction. The second projection part T32 protrudes rightward from the third facing part F3E, and is connected to the second connection part J32.

The fourth internal electrode E4E includes a fourth facing part F4E, a first connection part J41, a first projection part T41, a second connection part J42, and a second projection part T42.

The first connection part J41 connects the third external electrode G31E to the third external electrode G33E. The first projection part T41 has a narrower width than the fourth facing part F4E in the second direction. The first projection part T41 protrudes leftward from the fourth facing part F4E, and is connected to the first connection part J41.

The second connection part J42 connects the third external electrode G32E to the third external electrode G34E. The second projection part T42 has a narrower width than the fourth facing part F4E in the second direction. The second projection part T42 protrudes rightward from the fourth facing part F4E, and is connected to the second connection part J42.

As shown in FIG. 11, when viewed from above, the third facing part F3E is larger than the first facing part F1E, and the third facing part F3E includes the first facing part F1E and part of each of the first lead-out parts B1E.

Further, as shown in FIG. 12, when viewed from below, the fourth facing part F4E is larger than the second facing part F2E, and the fourth facing part F4E includes the second facing part F2E and part of each of the second lead-out parts B2E.

The third internal electrode E3E and the fourth internal electrode E4E have the same shape when viewed in the third direction, and the third internal electrode E3E and the fourth internal electrode E4E overlap each other in the entire area thereof when viewed in the third direction, for example.

Thus, at least part of the third internal electrode E3E and at least part of the fourth internal electrode E4E shield at least part of the first internal electrode E1E from at least part of the second internal electrode E2E, thereby suppressing the occurrence of cross-talk in which a signal leaks from the first internal electrode E1E to the second internal electrode E2E.

(4) Summary

As described above, a multilayer varistor (1) of a first aspect includes a sintered body (2), a first internal electrode (E1), a second internal electrode (E2), a third internal electrode (E3), and a fourth internal electrode (E4). The first internal electrode (E1), the second internal electrode (E2), the third internal electrode (E3), and the fourth internal electrode (E4) are disposed in the sintered body (2). The sintered body (2) has a first end face (S11) and a second end face (S12) opposite to each other in a first direction, a first side face (S21) and a second side face (S22) opposite to each other in a second direction intersecting the first direction, and a first main face (S31) and a second main face (S32) opposite to each other in a third direction intersecting the first direction and the second direction. The first internal electrode (E1), the second internal electrode (E2), the third internal electrode (E3), and the fourth internal electrode (E4) are arranged in an order of the first internal electrode (E1), the third internal electrode (E3), the fourth internal electrode (E4), and the second internal electrode (E2) from a side of the first main face (S31). The third internal electrode (E3) and the fourth internal electrode (E4) are electrically connected to each other. At least part of the first internal electrode (E1) and at least part of the third internal electrode (E3) overlap each other when viewed in the third direction. At least part of the second internal electrode (E2) and at least part of the fourth internal electrode (E4) overlap each other when viewed in the third direction.

This aspect enables a stray capacitance between the first internal electrode (E1) and the second internal electrode (E2) to be reduced, thereby suppressing the occurrence of cross-talk in which a signal leaks from the first internal electrode (E1) to the second internal electrode (E2).

In a multilayer varistor (1) of a second aspect referring to the first aspect, at least part of the third internal electrode (E3) and at least part of the fourth internal electrode (E4) overlap each other when viewed in the third direction.

In this aspect, the at least part of the third internal electrode (E3) and the at least part of the fourth internal electrode (E4) shield the at least part of the first internal electrode (E1) from the at least part of the second internal electrode (E2), thereby suppressing the occurrence of cross-talk.

In a multilayer varistor (1) of a third aspect referring to the first aspect, at least part of the first internal electrode (E1), at least part of the second internal electrode (E2), at least part of the third internal electrode (E3), and at least part of the fourth internal electrode (E4) overlap each other when viewed in the third direction.

In this aspect, the at least part of the third internal electrode (E3) and the at least part of the fourth internal electrode (E4) shield the at least part of the first internal electrode (E1) from the at least part of the second internal electrode (E2), thereby suppressing the occurrence of cross-talk. In addition, this aspect enables the multilayer varistor (1) to be downsized.

In a multilayer varistor (1) of a fourth aspect referring to any one of the first to third aspects, a first distance (D1) between the third internal electrode (E3) and the fourth internal electrode (E4) along the third direction is longer than each of a second distance (D2) between the first internal electrode (E1) and the third internal electrode (E3) along the third direction and a third distance (D3) between the second internal electrode (E2) and the fourth internal electrode (E4) along the third direction.

In this aspect, the distance between the first internal electrode (E1) and the second internal electrode (E2) is longer than each of the second distance (D2) and the third distance (D3), which reduces the stray capacitance between the first internal electrode (E1) and the second internal electrode (E2), thereby suppressing the occurrence of cross-talk.

In a multilayer varistor (1) of a fifth aspect referring to any one of the first to third aspects, a first distance (D1) between the third internal electrode (E3) and the fourth internal electrode (E4) along the third direction is 0.5 or more times each of a second distance (D2) between the first internal electrode (E1) and the third internal electrode (E3) along the third direction and a third distance (D3) between the second internal electrode (E2) and the fourth internal electrode (E4) along the third direction.

In this aspect, the distance between the first internal electrode (E1) and the second internal electrode (E2) is longer than each of the second distance (D2) and the third distance (D3), which reduces the stray capacitance between the first internal electrode (E1) and the second internal electrode (E2), thereby suppressing the occurrence of cross-talk.

In a multilayer varistor (1) of a sixth aspect referring to any one of the first to third aspects, a first distance (D1) between the third internal electrode (E3) and the fourth internal electrode (E4) along the third direction is 1.2 or more times each of a second distance (D2) between the first internal electrode (E1) and the third internal electrode (E3) along the third direction and a third distance (D3) between the second internal electrode (E2) and the fourth internal electrode (E4) along the third direction.

In this aspect, the distance between the first internal electrode (E1) and the second internal electrode (E2) is longer than each of the second distance (D2) and the third distance (D3), which reduces the stray capacitance between the first internal electrode (E1) and the second internal electrode (E2), thereby suppressing the occurrence of cross-talk.

In a multilayer varistor (1) of a seventh aspect referring to any one of the first to sixth aspects, a fourth distance (D4) between the first main face (S31) and the first internal electrode (E1) along the third direction is longer than a second distance (D2) between the first internal electrode (E1) and the third internal electrode (E3) along the third direction. A fifth distance (D5) between the second main face (S32) and the second internal electrode (E2) along the third direction is longer than a third distance (D3) between the second internal electrode (E2) and the fourth internal electrode (E4) along the third direction.

In this aspect, the distance between the first internal electrode (E1) and part of the second external electrode (G2) provided at the right end of the first main face (S31) is sufficiently longer than the second distance (D2), which reduces the stray capacitance between the first internal electrode (E1) and the second internal electrode (E2), thereby suppressing the occurrence of cross-talk. In addition, the distance between the second internal electrode (E2) and part of the first external electrode (G1) provided at the left end of the second main face (S32) is sufficiently longer than the third distance (D3), which reduces the stray capacitance between the first internal electrode (E1) and the second internal electrode (E2), thereby suppressing the occurrence of cross-talk.

A multilayer varistor (1) of an eighth aspect referring to any one of the first to seventh aspects further includes a fifth internal electrode (E5) and a sixth internal electrode (E6). The fifth internal electrode (E5) is disposed between the first internal electrode (E1) and the first main face (S31). The sixth internal electrode (E6) is disposed between the second internal electrode (E2) and the second main face (S32). The fifth internal electrode (E5) is electrically connected to the third internal electrode (E3). The sixth internal electrode (E6) is electrically connected to the fourth internal electrode (E4).

In this aspect, the fifth internal electrode (E5) shields at least part of the first internal electrode (E1) from the second external electrode (G2) disposed at the right end of the first main face (S31), thereby suppressing the occurrence of cross-talk. Further, the sixth internal electrode (E6) shields at least part of the second internal electrode (E2) from the first external electrode (G1) disposed at the left end of the second main face (S32), thereby suppressing the occurrence of cross-talk.

A multilayer varistor (1) of a ninth aspect referring to any one of the first to eighth aspects further includes a first external electrode (G1), a second external electrode (G2), and a third external electrode (G3) which are disposed on a surface of the sintered body (2). The first internal electrode (E1) is electrically connected to the first external electrode (G1). The second internal electrode (E2) is electrically connected to the second external electrode (G2). The third internal electrode (E3) and the fourth internal electrode (E4) are electrically connected to the third external electrode (G3).

This aspect enables the stray capacitance between the first internal electrode (E1) and the second internal electrode (E2) to be reduced, thereby suppressing the occurrence of cross-talk in which a signal leaks from the first internal electrode (E1) to the second internal electrode (E2).

A multilayer varistor (1) of a tenth aspect referring to any one of the first to ninth aspects, a first capacitance between the first internal electrode (E1) and the third internal electrode (E3) and a second capacitance between the second internal electrode (E2) and the fourth internal electrode (E4) are each equal to or less than 200 pF. A difference between the first capacitance and the second capacitance is less than or equal to 20% of the first capacitance.

This aspect enables influence of the difference between the first capacitance and the second capacitance over the surge-absorbing property of the multilayer varistor (1) to be reduced.

Note that the second to tenth aspects are not essential configurations for the multilayer varistor (1) and may be omitted as appropriate.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A multilayer varistor comprising:

a sintered body having a first end face and a second end face opposite to each other in a first direction, a first side face and a second side face opposite to each other in a second direction intersecting the first direction, and a first main face and a second main face opposite to each other in a third direction intersecting the first direction and the second direction;

a first internal electrode;

a second internal electrode;

a third internal electrode; and a fourth internal electrode, wherein:

the first internal electrode, the second internal electrode, the third internal electrode, and the fourth internal electrode are disposed in the sintered body, the first internal electrode, the second internal electrode, the third internal electrode, and the fourth internal electrode are arranged in an order of the first internal electrode, the third internal electrode, the fourth internal electrode, and the second internal electrode from a side of the first main face, the third internal electrode and the fourth internal electrode are electrically connected to each other, at least part of the first internal electrode and at least part of the third internal electrode overlap each other when viewed in the third direction, at least part of the second internal electrode and at least part of the fourth internal electrode overlap each other when viewed in the third direction, the first internal electrode includes a first facing part and a first lead-out part which has a narrower width in the second direction than the first facing part, the third internal electrode includes a third facing part and a third lead-out part which has a narrower width in the first direction than the third facing part, and the third facing part is larger than the first facing part when viewed in the third direction.

2. The multilayer varistor of claim 1, wherein at least part of the third internal electrode and at least part of the fourth internal electrode overlap each other when viewed in the third direction.

3. The multilayer varistor of claim 1, wherein at least part of the first internal electrode, at least part of the second internal electrode, at least part of the third internal electrode, and at least part of the fourth internal electrode overlap each other when viewed in the third direction.

4. The multilayer varistor of claim 1, wherein a first distance between the third internal electrode and the fourth internal electrode along the third direction is longer than each of a second distance between the first internal electrode and the third internal electrode along the third direction and a third distance between the second internal electrode and the fourth internal electrode along the third direction.

5. The multilayer varistor of claim 2, wherein a first distance between the third internal electrode and the fourth internal electrode along the third direction is longer than each of a second distance between the first internal electrode and the third internal electrode along the third direction and a third distance between the second internal electrode and the fourth internal electrode along the third direction.

6. The multilayer varistor of claim 3, wherein a first distance between the third internal electrode and the fourth internal electrode along the third direction is longer than each of a second distance between the first internal electrode and the third internal electrode along the third direction and a third distance between the second internal electrode and the fourth internal electrode along the third direction.

7. The multilayer varistor of claim 1, wherein a first distance between the third internal electrode and the fourth internal electrode along the third direction is 0.5 or more times each of a second distance between the first internal electrode and the third internal electrode along the third direction and a third distance between the second internal electrode and the fourth internal electrode along the third direction.

8. The multilayer varistor of claim 2, wherein a first distance between the third internal electrode and the fourth internal electrode along the third direction is 0.5 or more times each of a second distance between the first internal electrode and the third internal electrode along the third direction and a third distance between the second internal electrode and the fourth internal electrode along the third direction.

9. The multilayer varistor of claim 3, wherein a first distance between the third internal electrode and the fourth internal electrode along the third direction is 0.5 or more times each of a second distance between the first internal electrode and the third internal electrode along the third direction and a third distance between the second internal electrode and the fourth internal electrode along the third direction.

10. The multilayer varistor of claim 1, wherein a first distance between the third internal electrode and the fourth internal electrode along the third direction is 1.2 or more times each of a second distance between the first internal electrode and the third internal electrode along the third direction and a third distance between the second internal electrode and the fourth internal electrode along the third direction.

11. The multilayer varistor of claim 2, wherein a first distance between the third internal electrode and the fourth internal electrode along the third direction is 1.2 or more times each of a second distance between the first internal electrode and the third internal electrode along the third direction and a third distance between the second internal electrode and the fourth internal electrode along the third direction.

12. The multilayer varistor of claim 3, wherein a first distance between the third internal electrode and the fourth internal electrode along the third direction is 1.2 or more times each of a second distance between the first internal electrode and the third internal electrode along the third direction and a third distance between the second internal elect rode and the fourth internal electrode along the third direction.

13. The multilayer varistor of claim 1, wherein a fourth distance between the first main face and the first internal electrode along the third direction is longer than a second distance between the first internal electrode and the third internal electrode along the third direction, and a fifth distance between the second main face and the second internal electrode along the third direction is longer than a third distance between the second internal electrode and the fourth internal electrode along the third direction.

14. The multilayer varistor of claim 2, wherein a fourth distance between the first main face and the first internal electrode along the third direction is longer than a second distance between the first internal electrode and the third internal electrode along the third direction, and a fifth distance between the second main face and the second internal electrode along the third direction is longer than a third distance between the second internal electrode and the fourth internal electrode along the third direction.

15. The multilayer varistor of claim 3, wherein a fourth distance between the first main face and the first internal electrode along the third direction is longer than a second distance between the first internal electrode and the third internal electrode along the third direction, and a fifth distance between the second main face and the second internal electrode along the third direction is longer than a third distance between the second internal electrode and the fourth internal electrode along the third direction.

16. The multilayer varistor of claim 4, wherein a fourth distance between the first main face and the first internal electrode along the third direction is longer than a second distance between the first internal electrode and the third internal electrode along the third direction, and a fifth distance between the second main face and the second internal electrode along the third direction is longer than a third distance between the second internal electrode and the fourth internal electrode along the third direction.

17. The multilayer varistor of claim 5, wherein a fourth distance between the first main face and the first internal electrode along the third direction is longer than a second distance between the first internal electrode and the third internal electrode along the third direction, and a fifth distance between the second main face and the second internal electrode along the third direction is longer than a third distance between the second internal electrode and the fourth internal electrode along the third direction.

18. The multilayer varistor of claim 1, further comprising:

a fifth internal electrode between the first internal electrode and the first main face; and a sixth internal electrode between the second internal electrode and the second main face, wherein the fifth internal electrode is electrically connected to the third internal electrode, and the sixth internal electrode is electrically connected to the fourth internal electrode.

19. The multilayer varistor of claim 1, further comprising:

a first external electrode, a second external electrode, and a third external electrode which are disposed on a surface of the sintered body, wherein the first internal electrode is electrically connected to the first external electrode, the second internal electrode is electrically connected to the second external electrode, and the third internal electrode and the fourth internal electrode are electrically connected to the third external electrode.

20. The multilayer varistor of claim 1, wherein a first capacitance between the first internal electrode and the third internal electrode and a second capacitance between the second internal electrode and the fourth internal electrode are each equal to or less than 200 pF, and a difference between the first capacitance and the second capacitance is less than or equal to 20% of the first capacitance.

* * * * *